United States Patent
Horn et al.

(10) Patent No.: US 7,983,219 B2
(45) Date of Patent: Jul. 19, 2011

(54) HANDOFF OF AN ACCESS TERMINAL AT THE NETWORK LAYER IN AN ACCESS NETWORK

(75) Inventors: Gavin Horn, La Jolla, CA (US); Fatih Ulupinar, San Diego, CA (US); Paul E. Bender, San Diego, CA (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 624 days.

(21) Appl. No.: 11/759,896

(22) Filed: Jun. 7, 2007

(65) Prior Publication Data

US 2007/0286119 A1 Dec. 13, 2007

Related U.S. Application Data

(60) Provisional application No. 60/811,875, filed on Jun. 7, 2006.

(51) Int. Cl.
*H04W 4/00* (2009.01)
*H04W 36/00* (2009.01)
*H04J 3/24* (2006.01)

(52) U.S. Cl. ........ 370/331; 370/328; 370/332; 370/338; 370/349; 455/436

(58) Field of Classification Search .......... 455/418–428, 455/422.1, 436–451, 452.1–452.2, 432.1–432.3, 455/433–434, 41.2, 435.2, 456.2, 466, 514, 455/517, 524–525, 550.1, 552.1, 556.2, 560–561; 370/328–329, 338, 341, 252, 310, 331–333, 370/346, 349
See application file for complete search history.

(56) References Cited

U.S. PATENT DOCUMENTS

| 6,975,864 | B2 | 12/2005 | Singhal et al. | |
|---|---|---|---|---|
| 7,130,614 | B2* | 10/2006 | Sreemanthula et al. | 455/411 |
| 7,546,124 | B1* | 6/2009 | Tenneti et al. | 455/436 |
| 2003/0212764 | A1* | 11/2003 | Trossen et al. | 709/219 |

(Continued)

FOREIGN PATENT DOCUMENTS

EP 1202591 5/2002

(Continued)

OTHER PUBLICATIONS

International Preliminary Report on Patentability—PCT/US2007/070656. The International Bureau of WIPO—Geneva, Switzerland, Dec. 10, 2008.

(Continued)

*Primary Examiner* — Meless N Zewdu
(74) *Attorney, Agent, or Firm* — Milan Patel; Darren M. Simon

(57) ABSTRACT

An apparatus for accessing an access network includes a processing system configured to maintain an active set comprising a plurality of network functions, the processing system being further configured to support a handoff of a network layer attachment point from a first one of the network functions to a second one of the network functions by sending a message to each of the network functions which identifies the second one of the network functions as a target of the handoff and performing a binding update for the second one of the network functions with a home agent.

20 Claims, 4 Drawing Sheets

U.S. PATENT DOCUMENTS

| | | | |
|---|---|---|---|
| 2003/0225892 | A1 | 12/2003 | Takusagawa et al. |
| 2005/0186957 | A1* | 8/2005 | Sako et al. .................... 455/423 |
| 2005/0266847 | A1* | 12/2005 | Tinnakornsrisuphap et al. .............................. 455/436 |
| 2005/0271014 | A1* | 12/2005 | Gillies et al. .................. 370/331 |
| 2006/0146767 | A1* | 7/2006 | Moganti ...................... 370/338 |
| 2007/0183366 | A1* | 8/2007 | Park .............................. 370/331 |

FOREIGN PATENT DOCUMENTS

| | | |
|---|---|---|
| RU | 2265959 | 12/2005 |
| TW | I234966 | 6/2005 |
| TW | I255112 | 5/2006 |
| WO | 2006052563 | 5/2006 |

OTHER PUBLICATIONS

International Search Report—PCT/US07/07/070656, International Search Authority—European Patent Office—Nov. 2, 2007.

Charles Perkins, David B. Johnson "Route Optimization in Mobile IP", published on Feb. 15, 2000, [found on Mar. 24, 2010], found on the Internet: <URL: http://www.monarch.cs.rice.edu/internet-drafts/draft-ietf-mobileip-optim-09.txt>.

Taiwanese Search report—096120623—TIPO—Oct. 14, 2010.

Written Opinion—PCT/US07/070656, International Search Authority, European Patent Office, Nov. 2, 2007.

* cited by examiner

HANDOFF OF AN ACCESS TERMINAL AT THE NETWORK LAYER IN AN ACCESS NETWORK

RELATED APPLICATIONS

The present application claims the benefit of U.S. Provisional Patent Application Ser. No. 60/811,875 filed on Jun. 7, 2006, titled "A METHOD AND APPARATUS FOR LAYER 3 HANDOFF" which is hereby expressly incorporated by reference.

BACKGROUND

1. Field

The present disclosure relates generally to wireless communication networks, and more particularly, to various concepts and techniques for handing off an access terminal at the network layer in an access network.

2. Background

Wireless communication systems are widely deployed to provide various communication services such as telephony, video, data, messaging, broadcasts, and so on. These systems commonly employ an access network capable of connecting multiple access terminals to a wide area network (WAN) by sharing the available network resources. The access network is generally implemented with multiple access points dispersed throughout a geographic coverage region. The geographic coverage region is generally divided into cells with an access point in each cell. The cell may be further divided into sectors. The access point generally includes one transceiver function for each sector in the cell. The transceiver function provides an air interface attachment point for access terminals in the sector.

The access network may also include one or more network functions. In a typical configuration, the network function acts as a controller for any number of transceiver functions and performs various tasks including allocating, managing and tearing down resources for the access terminals. The network function also provides an Internet Protocol (IP) layer attachment point (IAP) for the access terminals. All IP packets destined for the access terminal are sent via the IAP. The access network may have a centralized network architecture defined here as multiple network functions supporting multiple access points, i.e., each network function supporting multiple access points and each access point supported by multiple network functions, or a distributed network architecture defined here as dedicated network function for each access point, i.e., each network function supports a single access point and each access point is supported by a single network function.

In addition to providing an IP layer attachment point, the IAP may also responsible maintaining a session state for any number of access terminals. The session state for an access terminal is the state of the access network on the control path between the access terminal and the IAP that is preserved when a connection is closed. The session state includes the value of the attributes that are negotiated between the access terminal and the access network. These attributes affect the characteristics of the connection and the service received by the access terminal. By way of example, an access terminal may negotiate the quality of service (QoS) configuration for a new application and supply new filter and flow specifications to the access network indicating the QoS service requirements for the application. As another example, the access terminal may negotiate the size and type of the headers used in communication with the access network.

In some wireless communication systems, an access terminal in a given sector establishes a connection with an access point by making an access attempt on an access channel of a transceiver function serving that sector. The network function associated with the transceiver function receiving the access attempt contacts the session master for the access terminal and retrieves a copy of the access terminal's session state. On a successful access attempt, the access terminal is assigned air interface resources such as a MAC ID and data channels to communicate with the transceiver function serving the sector. In addition, the IAP is moved to the serving network function, or alternatively, an IP tunneling protocol is used to send IP packets between the IAP and the serving network function.

In some wireless communication systems, once the access terminal establishes a connection with an access point, it listens for other sectors and measures the signal strength of the sectors it can hear. The access terminal uses these measurements to create an active set. The active set is a set of sectors that have reserved air interface resources for the access terminal. The access terminal will continue to measure the signal strength of other sectors and may add or remove sectors from the active set as it moves around the access network. Alternatively, the access terminal can send a report of the signal strength measurements to the access network so that the access network can maintain the active set.

One function of the active set is to allow the access terminal to quickly switch between sectors and maintain service without having to make a new access attempt. The process of switching sectors, either on the forward or reverse link, is often referred to as a "L2" handoff because it constitutes a handoff of the access terminal at the link layer. The access network uses the active set to quickly perform L2 handoff by (1) reserving air interface resources for the access terminal in each of the sectors in the active set, and (2) providing a copy of the session state from the session master to each network function serving a sector in the active set.

Another technique that may be used to support quick handoff of the access terminal is to switch sectors without moving the IAP. The process of moving the IAP is often referred to as a "L3" handoff because it constitutes a handoff of the access terminal at the network layer. By decoupling the L2 and L3 handoffs, the distance between the IAP and the serving access point may increase as the access terminal moves through the access network. In such a scenario, it may be desirable to move the IAP closer to the access terminal to improve the latency and routing efficiency experienced on the backhaul. If the IAP serves as the session master, then the session state also needs to be transferred.

The L3 handoff has been traditoinally controlled by the access network. This is often referred to as "network based mobility management." Using the access terminal to control the L3 handoff ("AT based mobility management") has often been considered too slow for high speed applications, such as voice. However, AT based mobility management has some advantages, such as allowing for a single mechanism for inter and intra technology, or global and local mobility. It also simplifies the network interfaces further by not requiring the network elements to determine when to do L3 handoff.

Accordingly, there is a need in the art for optimizing the L3 handoff to support AT based mobility management. Optimizing the L3 handoff is a useful feature for every system regardless of the network architecture since it simplifies network interfaces and should also improve the seamlessness of the L3 handoff.

SUMMARY

In accordance with one aspect of the disclosure, an apparatus for accessing an access network includes a processing system configured to maintain an active set comprising a plurality of network functions, the processing system being further configured to support a handoff of a network layer attachment point from a first one of the network functions to a second one of the network functions by sending a message to each of the network functions which identifies the second one of the network functions as a target of the handoff and performing a binding update for the second one of the network functions with a home agent.

It is understood that other aspects of the invention will become readily apparent to those skilled in the art from the following detailed description, wherein it is shown and described only various aspects of the invention by way of illustration. As will be realized, the invention is capable of other and different configurations and its several details are capable of modification in various other respects, all without departing from the scope of the invention. Accordingly, the drawings and detailed description are to be regarded as illustrative in nature and not as restrictive.

DETAILED DESCRIPTION

The detailed description set forth below in connection with the appended drawings is intended as a description of various aspects of the invention and is not intended to represent the only aspects of the invention. The detailed description includes specific details for the purpose of providing a thorough understanding of the invention. However, it will be apparent to those skilled in the art that the invention may be practiced without these specific details. In some instances, well known structures and components are shown in block diagram form in order to avoid obscuring the concepts of the invention.

The various concepts presented throughout this disclosure may be utilized across a broad array of communication systems. By way of example, a wireless communications system based on Ultra Mobile Broadband (UMB) could benefit from these concepts. UMB is an air interface standard promulgated by the 3GPP2, as part of the CDMA2000 family of standards. UMB is typically employed to provide Internet access to mobile subscribers. Another example of a wireless communications system that could benefit from these techniques is a system based on IEEE 802.20. IEEE 802.20 is a packet-based air interface designed for Internet Protocol (IP) based services. For clarity of presentation, various concepts will now be presented with reference to a distributed network architecture, however, these concepts are equally applicable to a centralized network architecture and may be readily extended to other wireless communication systems.

Figure 1:
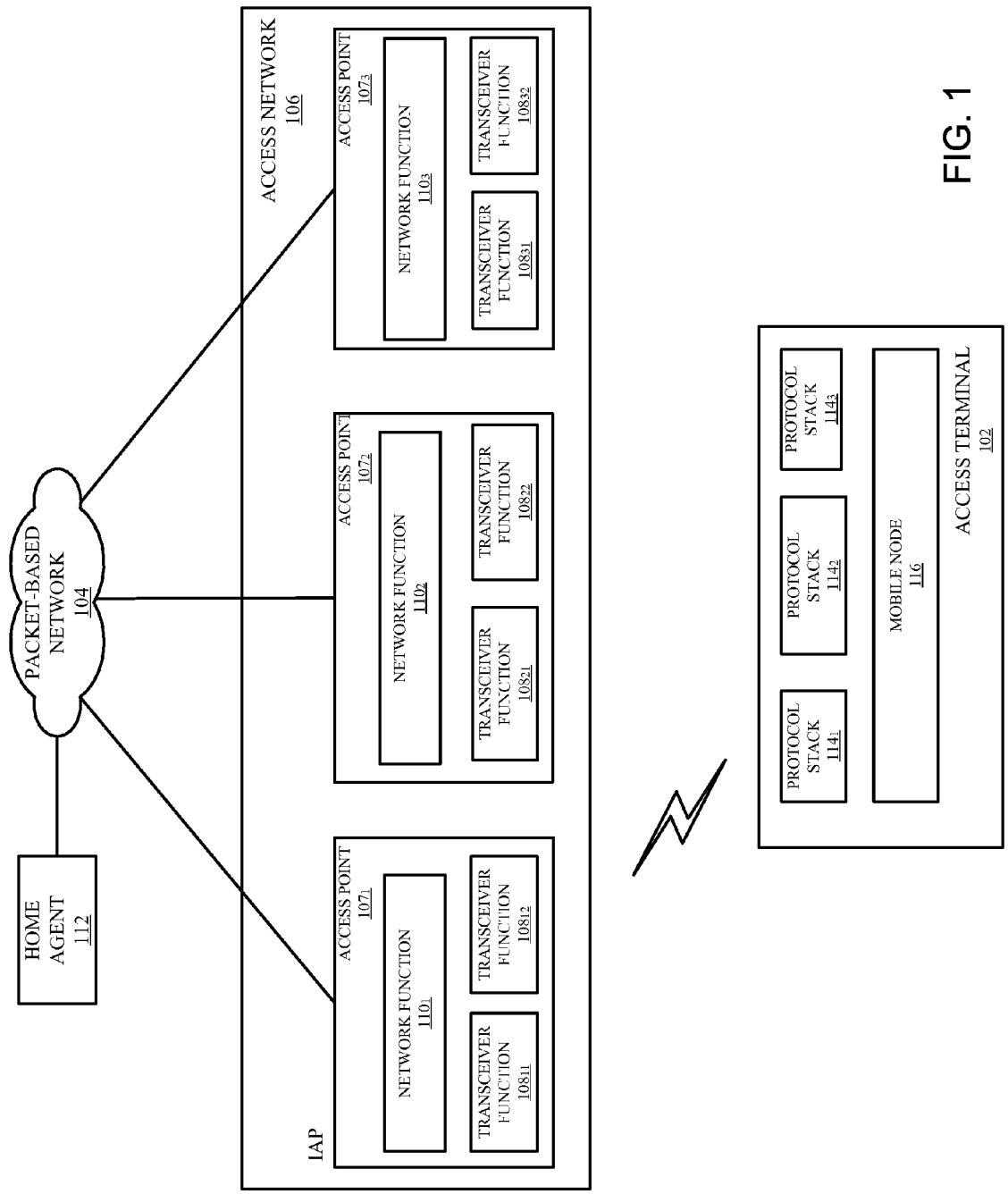
FIG. 1 is a conceptual block diagram of illustrating a distributed access network architecture including an access terminal.

FIG. 1 is a conceptual block diagram illustrating a distributed access network architecture including an access terminal. An access terminal 102 is shown connected to packet-based network 104, such as the Internet, through an access network 106. The access terminal 102 may be a fixed or mobile device in which a user can obtain service from the access network 106. By way of example, the access terminal 102 may be a cellular phone, a personal digital assistant (PDA), a personal computer, a laptop computer, a digital camera, a digital camcorder, a game console, an audio device, a video device, a multimedia device, or any other suitable device capable of receiving service from the access network 106.

The access network 106 includes multiple access points $107_1$-$107_3$ dispersed throughout a cellular coverage region with an access point located in each cell. The access point 107 includes a separate transceiver function 108 for each sector in the cell that it is serving. The transceiver function 108 is used to provide an air interface attachment point for access terminals in its sector. In this example, the air interface attachment point for the access terminal 102 shown in FIG. 1 is the transceiver function $108_{12}$. This transceiver function $108_{12}$ is referred to as the serving transceiver function.

Each access point 107 also includes a network function 110. The network function 110 is responsible for controlling the transceiver functions 108 in the access point 107 and performs tasks like allocating, managing and tearing down resources for an access terminal. In this example, the network function 101 is the serving network function because it controls the transceiver function $108_{12}$ that serves as the air interface attachment point for the access terminal 102. The serving network function $110_1$ may provide the IAP for the access terminal 102. Alternatively, the IAP may be located elsewhere and an IP tunneling protocol may be used to send IP packets between the IAP and the serving network function $110_1$. A home agent 112, responsible for maintaining a connection over the packet-based network 104, exchanges IP packets with the access terminal 102 through the IAP.

As the radio conditions change, the access terminal 102 may perform a L2 handoff by changing its air interface attachment point to a new sector in the active set. The access terminal 102 performs filtered measurements on the radio conditions for the forward and reverse links for all sectors in the active set. By way of example, in a UMB based communications system, the access terminal 102 can measure the signal-to-interference noise ratio (SINR) on the acquisition pilots, the common pilot channel (if present), and the pilots on the shared signaling channel to select the forward link sector. For the reverse link, the access terminal 102 can measure the CQI erasure rate for each sector in the active set based on the up/down power control commands to the access terminal 102 from the sector.

The L2 handoff is asynchronous to the L3 handoff. A L3 handoff involves a home agent binding update at the target IAP and requires that all of the network functions 110 serving sectors in the active set to update their IP tunnels to indicate the new location of the IAP. In addition if the session master is colocated with the IAP, all of the network functions 110 serving sectors in the active set to update their unicast access terminal identifier (UATI) to indicate the new location of the session master. This process is rather slow, and therefore, would prevent the access terminal 102 from quickly switching between sectors while minimizing the affect on the QoS of active applications if it were not for the decoupling of the L2 and L3 handoff.

There are three main types of state for an active access terminal 102 that have an impact on a L3 handoff: a data state, a connection state, and a session state. The data state is the state in the access network 106 in the data path between the access terminal 102 and a network function 110 during a connection. The data state includes things such as header compressor state or radio link protocol (RLP) buffer states which are very dynamic and difficult to transfer between access points 107. The connection state is the state in the access network 106 on the control path between the access terminal 102 and a network function 107 that is not a preserved when a connection closes and the access terminal 102 is idle. The connection state may include such information as the set of air interface resources reserved for the access terminal, power control loop values, soft handoff timing, and active set information. The session state has been discussed in the background portion of this disclosure and will not be repeated here.

In a L3 handoff, all three types of state may need to be transferred from the serving IAP to the target IAP. If only an idle access terminal 102 can make a L3 handoff, then only the session state needs to be transferred. To support a L3 handoff for an active access terminal 102, the data and connection state may also need to be transferred.

In some wireless communication systems, the handoff of the L3 data state is simplified by defining multiple routes, where the data state for each route is local to that route, i.e., the routes each have an independent data state. By associating each network function 110 with a separate route, there is no data loss during the L3 handoff and packets can be processed from the old and new IAP simultaneously.

A L3 handoff for an active access terminal 102 may be further simplified by moving the control of the connection state from the IAP and making it local to each network function 110 in the active set. This is done by defining multiple control routes (or control stacks) and defining the air interface so that the control stacks are independent and local to each network function 110. This may require that some of the negotiating and managing for the allocation and tearing down of resources for the connection state be transferred to the access terminal 102 since there is no longer a single network function 110 to manage all the sectors of the active set. Some additional requirements on the air interface design may also be required to avoid a tight coupling between the transceiver functions 108, since different transceiver functions 108 serving sectors in the active set may not share the same network function 110. By way of example, it may be preferable to eliminate all tight synchronization between transceiver functions 108 that do not have the same network function 110, such as power control loops, soft handoff, etc.

Making the data and connection state local to the network functions 110, eliminates the need to transfer these states on a L3 handoff, and also should make the interface between the network functions 110 simpler.

The access terminal 102 uses a separate protocol stack $114_1$-$114_3$ to communicate with different network functions 110, as well as the addressing mechanisms for the access terminal 102 and the transceiver functions 108 to logically distinguish between these stacks. Each protocol stack $114_1$-$114_3$ includes a data and control stack which communicate with a mobile node 116 to support IP layer mobility at the access terminal 102.

Fundamentally, some of the attributes of session state (e.g., QoS profile, security keys, etc) cannot be made local to a network function 110 (or IAP) because it is too expensive to negotiate every time there a new network function is added to the active set or when there is a session master handoff. Thus, the concepts presented below deal with various techniques to transfer the session master during a L3 handoff in an optimal way that is suitable for AT based mobility management when the IAP and session master are colocated.

Figure 2:
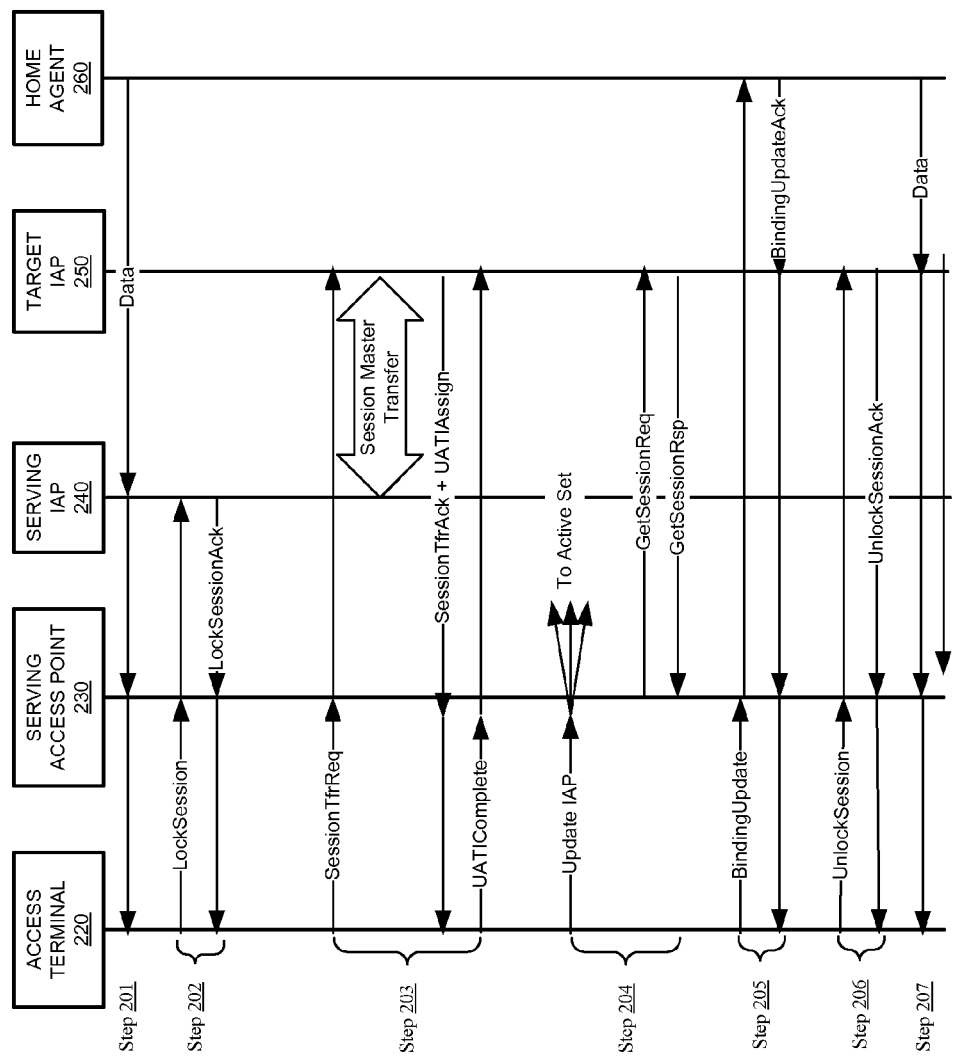
FIG. 2 is a diagram illustrating an example of a call flow for a L3 handoff between a source and target IAP.

FIG. 2 is a diagram illustrating an example of a call flow for an access terminal initiated L3 handoff between a source and target IAP where the IAP and session master are colocated. The data flow through the access network is shown in step 201. Specifically, data is routed from the home agent 260 to the serving IAP 240. The serving IAP 240 tunnels the data to the serving access point 230, which transmits the data over the air to the access terminal 220.

The L3 handoff begins with step 202 by locking the session state at the serving IAP 240, since negotiating changes to the session during a session transfer is difficult to manage. The access terminal 220 transmits a "lock session" message over the air to the serving access point 230, which forwards the message to the serving IAP 240 using a L2 tunneling protocol. The serving IAP 240 locks the session state and then sends a "lock session acknowledgement" back to the serving access point 230 using the same tunneling protocol, which transmits the acknowledgement over the air to the access terminal 220.

Next, in step 203, the access terminal 220 decides to do a L3 handoff by initiating the transfer of the session by transmitting a "session transfer request" over the air to the serving access point 230. Using a L2 tunneling protocol, the serving access point 230 forwards the request to the target IAP 250. In response to the request, the target IAP 250 transfers the control as the session master from the serving IAP 240. The target IAP 250 sends a "session transfer acknowledgement" and a "UATI assignment message" to the serving access point 230 using a L2 tunneling protocol, which then transmits the signal over the air to the access terminal 220. The "session transfer acknowledgement" indicates the target IAP 250 is now the session master and the "UATI assignment message" indicates the new identifier for the access terminal 220 to address the target IAP 240. The session master transfer is complete when the access terminal 220 transmits a "UATI complete" message over the air to the serving access point 230, which forwards the message to the target IAP 250 using a L2 tunneling protocol.

The access terminal 220 may request the L3 handoff in response to any suitable event. The event may be, for example, a L2 handoff. Alternatively, the event may be the occurrence of some activity that effects on one or more quality metrics for the access network, such as sector loading, signal strength, active QoS flows, etc.

As an alternatively to steps 202 and 203, the L3 handoff may be initiated by the access network. In this case, the access network locks the session state, transfers the session state from the serving IAP 240 to the target IAP 250, and sends a message to the access terminal 220 indicating that the transfer of the session state has been completed by the access network.

In step 204, the tunnels to the target IAP 250 are updated at each network function serving a sector in the active set. This is achieved by transmitting an "update IAP" message over the air from the access terminal 220 to the serving access point 230. The access terminal 220 includes the UATI for the target IAP 250 in the "update IAP" message. The "update IAP" is then sent to each network function serving a sector in the active set using a L2 tunneling protocol. Each network function updates their tunnels and then pulls a copy of the current session state from the target IAP 250 by sending a "get session request" message using a L2 tunneling protocol. A "get session response" is tunneled back to each of the network functions serving a sector in the active set which includes the attributes for the session state.

In step 205, the access terminal 220 indicates to the home agent 260 that there is a new IAP, by sending a "binding update" message to the home agent 260 using mobile IP (MIP) signaling. The home agent 260 updates its routing tables to point to the target IAP 250 and responds with a "binding acknowledgement" using the same MIP signaling to the target IAP 250. The target IAP 250 tunnels the data to the serving access point 230, which transmits the data over the air to the access terminal 220.

The L3 handoff completes with step 206 by unlocking the session state at the target IAP 250 so that changes to the session state can occur. Although not shown, any changes to the session state at the target IAP 250 must be pushed out to each network function serving a sector in the active set. The access terminal 220 transmits an "unlock session" message over the air to the serving access point 230, which forwards the message to the target IAP 250 using a L2 tunneling protocol. The target IAP 250 unlocks the session state and then sends an "unlock session acknowledgement" back to the serving access point 230 using the same tunneling protocol, which transmits the acknowledgement over the air to the access terminal 220. Step 206 can occur in parallel with step 204 or may be implicit when step 203 completes.

The serving IAP 240 may also initiate the L3 handoff by sending a message to the access terminal 220. In this case, the serving IAP 240 may perform a discovery procedure to find a potential target IAP suitable for the L3 handoff. By way of example, the serving IAP 240 may check whether the target IAP 250 can support the attributes or protocols of the current session state.

Once the L3 handoff is complete, the data flow through the access network is shown in step 207. Specifically, data is routed from the home agent 260 to the target IAP 250, which is now the serving IAP. The new serving IAP 250 tunnels the data to the serving access point 230, which transmits the data over the air to the access terminal 220.

Alternatively, the session master is not transferred with the IAP in which case steps 202, 203 and 206 are omitted.

Figure 3:
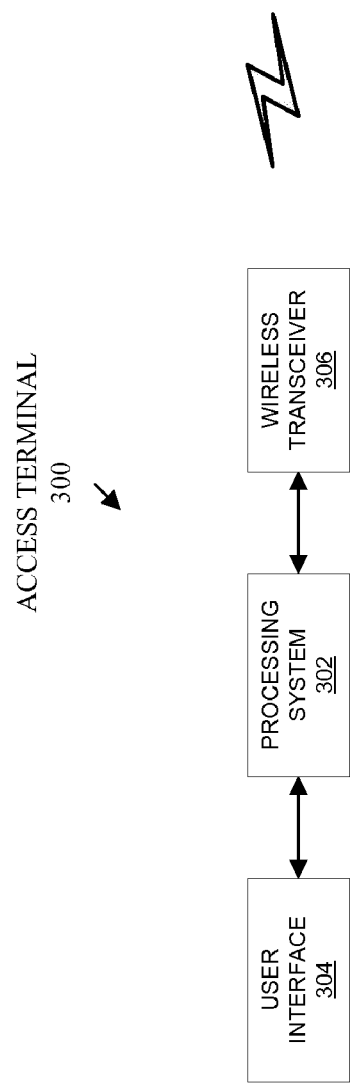
FIG. 3 is a conceptual block diagram illustrating an example of the hardware configuration for an access point and access terminal.

FIG. 3 is a conceptual block diagram illustrating an example of the hardware configuration for an access terminal. In this example, the access terminal 300 is shown with a processing system 302, a user interface 304, and a wireless transceiver 306. The wireless transceiver 306 is used to implement the analog portion of the physical layer for the access terminal 102 by demodulating wireless signals and performing other RF front end processing. The processing system 302 is used to implement the digital processing portion of the physical layer, the link layer, the network layer, and all upper layer functions. A user interface 304 is provided to allow the user to operate the access terminal 102, and may include, by way of example, a display and keypad.

The processing system 302 may be implemented with one or more processors. A processor may be a general purpose processor, such as a microprocessor, a specific application processor, such a digital signal processor (DSP), or any other hardware platform capable of supporting software. Software shall be construed broadly to mean any combination of instructions, data structures, or program code, whether referred to as software, firmware, middleware, microcode, or any other terminology. Alternatively, a processor may be an application specific integrated circuits (ASIC), a programmable logic device (PLD), a field programmable gate array (FPGA), a controller, a micro-controller, a state machine, or a combination of discrete hardware components, or any combination thereof. The processing system 302 may also include a machine readable medium for storing software executed by the one or more processors. The machine readable medium may include one or more storage devices that are implemented, either in whole or part, within the processing system 302. The machine readable medium may also include one or more storage devices remote to the processing system 302 or be embodied by a transmission line or a carrier wave that encodes a data signal. Those skilled in the art will recognize how best to implement the described functionality for the processing system 302.

Figure 4:
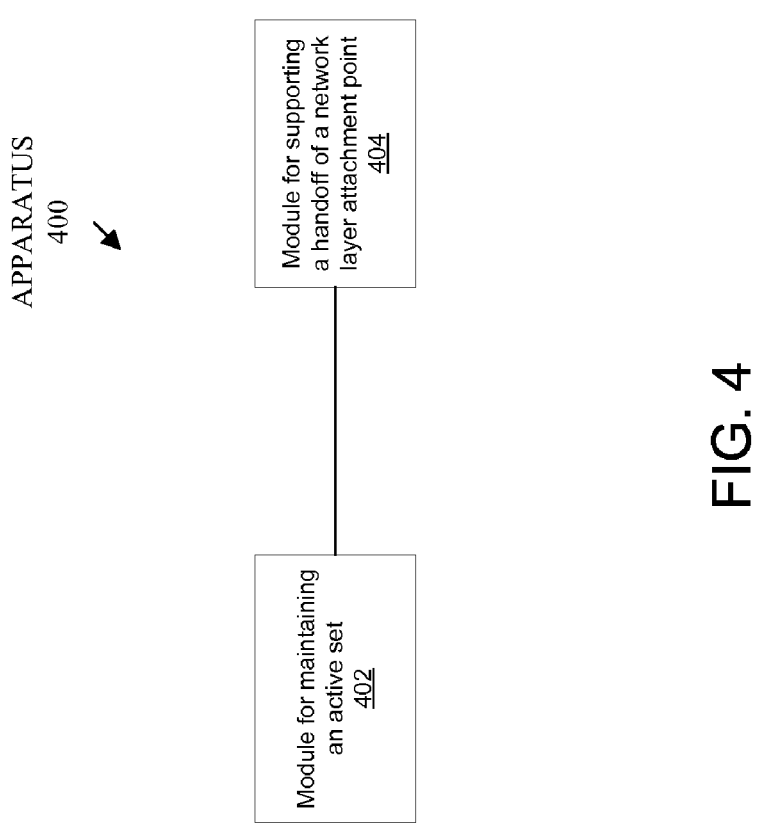
FIG. 4 is a block diagram illustrating an example of the functionality of a processing system in an apparatus for accesing an access network.

FIG. 4 is a block diagram illustrating an example of the functionality of a processing system in an apparatus for accessing an access network. The apparatus 400 may be an access terminal or other entity. The apparatus 400 includes a module 402 for maintaining an active set. The active set comprises sectors served by a plurality of network functions. The apparatus 400 also includes a module 404 for supporting a handoff of a network layer attachment point from a first one of the network functions to a second one of the network functions by sending a message to each of the network functions which identifies the second one of the network functions as a target of the handoff, and performing a binding update for the second one of the network functions with a home agent.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. An apparatus for accessing an access network, comprising:
   a processing system configured to maintain an active set comprising sectors served by a plurality of network functions, the processing system being further configured to support a handoff of a network layer attachment point from a first one of the network functions to a second one of the network functions by sending a message to each of the network functions which identifies the second one of the network functions as a target of the handoff and performing a binding update for the second one of the network functions with a home agent;
   wherein the processing system is further configured to support a transfer of a session state from the first one of the network functions to the second one of the network functions during the handoff; and
   wherein the processing system is further configured to request the transfer of the session state and perform the binding update upon receiving an acknowledgement in response to the request to transfer the session state.

2. The apparatus of claim 1 wherein the processing system is further configured to lock the session state at the first one of the network functions before the session state is transferred, and unlock the session state at the second one of the network functions after the session state is transferred.

3. The apparatus of claim 1 wherein the acknowledgement includes an identifier, and wherein the processing system is further configured to use the identifier as its identifier when accessing the access network.

4. The apparatus of claim 1 wherein the processing system is further configured to request the transfer of the session state in response to air interface attachment point for the apparatus being moved to a transceiver function controlled by the second one of the network functions.

5. The apparatus of claim 1 wherein the processing system is further configured to request the transfer of the session state based on one or more quality metrics for the access network.

6. The apparatus of claim 1 wherein the processing system is further configured to receive a message from the access network indicating that the transfer of the session state has been requested by the access network and completed.

7. The apparatus of claim 1 wherein the processing system is further configured to support a transfer of a data state and a connection state from the first one of the network functions to the second one of the network functions during the handoff.

8. An apparatus for accessing an access network, comprising:
means for maintaining an active set comprising sectors served by a plurality of network functions;
means for supporting a handoff of a network layer attachment point from a first one of the network functions to a second one of the network functions by sending a message to each of the network functions which identifies the second one of the network functions as a target of the handoff, and performing a binding update for the second one of the network functions with a home agent;
means for supporting a transfer of a session state from the first one of the network functions to the second one of the network functions during the handoff; and
means for requesting the transfer of the session state, and wherein the means for supporting the handoff is configured to perform the binding update upon receiving an acknowledgement in response to the request to transfer the session state.

9. The apparatus of claim 8 further comprising means for locking the session state at the first one of the network functions before the session state is transferred and means for unlocking the session state at the second one of the network functions after the session state is transferred.

10. The apparatus of claim 8 wherein the acknowledgement includes an identifier, the apparatus further comprising means for using the identifier as its identifier when accessing the access network.

11. The apparatus of claim 8 wherein the means for requesting the transfer of the session state is configured to request the transfer in response to air interface attachment point for the apparatus being moved to a transceiver function controlled by the second one of the network functions.

12. The apparatus of claim 8 wherein the means for requesting the transfer of the session state is configured to request the transfer based on one or more quality metrics for the access network.

13. The apparatus of claim 8 further comprising means for receiving a message from the access network indicating that the transfer of the session state has been requested by the access network and completed.

14. A method of communicating with an access network, comprising:
maintaining by the access terminal an active set comprising sectors served by a plurality of network functions;
supporting by the access terminal a handoff of a network layer attachment point from a first one of the network functions to a second one of the network functions by sending a message to each of the network functions which identifies the second one of the network functions as a target of the handoff, and performing a binding update for the second one of the network functions with a home agent;
supporting a transfer of a session state from the first one of the network functions to the second one of the network functions during the handoff; and
requesting the transfer of the session state, and wherein the binding update is performed upon receiving an acknowledgement in response to the request to transfer the session.

15. The method of claim 14 further comprising locking the session state at the first one of the network functions before the session state is transferred and unlocking the session state at the second one of the network functions after the session state is transferred.

16. The method of claim 14 wherein the acknowledgement includes an identifier, the method further comprising using the identifier as its identifier when accessing the access network.

17. The method of claim 14 further comprising moving an air interface attachment point from a transceiver function controlled by the first one of the network functions to a transceiver function controlled by the second one of the network functions, and wherein the request to transfer of the session state is in response to air interface attachment point being moved.

18. The method of claim 14 wherein the request to the transfer the session state is based on one or more quality metrics for the access network.

19. The method of claim 14 further comprising receiving a message from the access network indicating that the transfer of the session state has been requested by the access network and completed.

20. The method of claim 14 further comprising supporting a transfer of a data state and a connection state from the first one of the network functions to the second one of the network functions during the handoff.

* * * * *